(12) United States Patent
Silverstein et al.

(10) Patent No.: US 11,798,058 B2
(45) Date of Patent: Oct. 24, 2023

(54) IDENTIFYING PACKAGE BUNDLING ON AN ECOMMERCE PLATFORM

(71) Applicant: International Business Machines Corporation, Armonk, NY (US)

(72) Inventors: Zachary A. Silverstein, Austin, TX (US); Kelly Camus, Durham, NC (US); Tiberiu Suto, Franklin, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/195,804

(22) Filed: Mar. 9, 2021

(65) Prior Publication Data

US 2022/0292566 A1 Sep. 15, 2022

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0625* (2013.01); *G06Q 30/0641* (2013.01)

(58) Field of Classification Search
CPC ........... G06Q 30/0631; G06Q 30/0625; G06Q 30/0641
See application file for complete search history.

(56) References Cited

U.S. PATENT DOCUMENTS

| | | | |
|---|---|---|---|
| 7,103,566 B2* | 9/2006 | Silva | G06Q 30/06 705/26.8 |
| 8,290,818 B1* | 10/2012 | Levitan | G06Q 30/0631 705/26.7 |
| 8,438,052 B1* | 5/2013 | Chanda | G06Q 30/0207 705/7.11 |
| 9,189,811 B1* | 11/2015 | Bhosle | G06Q 30/0641 |
| 9,483,789 B1* | 11/2016 | Hanlon | G06Q 30/0631 |
| 9,589,293 B1* | 3/2017 | Yalamanchi | G06Q 30/0625 |
| 9,679,532 B2* | 6/2017 | Dorner | G06Q 30/0627 |
| 10,810,626 B2* | 10/2020 | Nagarathinam | G06Q 30/0269 |

(Continued)

OTHER PUBLICATIONS

"Bundle Recommendation with Graph Convolutional Networks," by Jianxin Chang, Gao Chen, Xiangnan He, Yong Li, and Depeng Jin, arXiv.org, Ithaca: Cornell University Library, arXiv.org. (May 7, 2020) (Year: 2020).*

(Continued)

*Primary Examiner* — Anne M Georgalas
(74) *Attorney, Agent, or Firm* — Michael O'Keefe

(57) ABSTRACT

In an approach to identifying package bundling on an ecommerce platform, one or more computer processors receive a search query from a user for a primary product in an ecommerce platform. One or more computer processors retrieve a search history of the primary product. One or more computer processors retrieve a product history of the primary product. Based on the retrieved search history and the retrieved product history, one or more computer processors create an ontology tree that includes the primary product and one or more related products. Based on the ontology tree, one or more computer processors determine one or more product bundles that include the primary product and at least one of the one or more related products. One or more computer processors generate a first checklist of the one or more product bundles. One or more computer processors display the first checklist to the user.

17 Claims, 3 Drawing Sheets

(56) References Cited

U.S. PATENT DOCUMENTS

| | | | |
|---|---|---|---|
| 10,853,872 B1* | 12/2020 | Collins | G06Q 30/0641 |
| 2007/0150361 A1* | 6/2007 | Kreiner | G06Q 30/0633 |
| | | | 705/26.7 |
| 2011/0145093 A1* | 6/2011 | Paradise | G06Q 30/02 |
| | | | 705/26.1 |
| 2012/0203669 A1 | 8/2012 | Borsch | |
| 2012/0323727 A1 | 12/2012 | Batra | |
| 2013/0191214 A1 | 7/2013 | Flinn | |
| 2015/0324895 A1 | 11/2015 | Kajamohideen | |
| 2016/0189275 A1* | 6/2016 | Velusamy | G06Q 30/0633 |
| | | | 705/26.8 |
| 2018/0330427 A1 | 11/2018 | Hussain | |
| 2019/0102817 A1* | 4/2019 | Padaki | G06F 3/04847 |
| 2019/0130471 A1* | 5/2019 | DePizzol | G06Q 30/0627 |
| 2019/0253514 A1 | 8/2019 | Yankovich | |
| 2019/0362407 A1 | 11/2019 | Garg | |
| 2020/0364767 A1 | 11/2020 | Bacharach | |

OTHER PUBLICATIONS

Chen et al., "A Method and System for Automation of Product Bundling Service by Scalable Complementary Products Discovery", An IP.com Prior Art Database Technical Disclosure, IP.com No. IPCOM000239857D, IP.com Electronic Publication Date: Dec. 5, 2014, 3 Pages.

* cited by examiner

IDENTIFYING PACKAGE BUNDLING ON AN ECOMMERCE PLATFORM

BACKGROUND OF THE INVENTION

The present invention relates generally to the field of ecommerce, and more particularly to identifying package bundling on an ecommerce platform.

Natural language processing (NLP) is a field of computer science, artificial intelligence, and linguistics concerned with the interactions between computers and human (natural) languages. As such, natural language processing is related to the area of human-computer interaction. Many challenges in natural language processing involve natural language understanding, that is, enabling computers to derive meaning from human or natural language input.

Electronic commerce (referred to herein as "ecommerce") is a growing sector of the U.S. and world economies. Ecommerce is the activity of electronically buying or selling products or online services over the Internet. Ecommerce draws on technologies such as mobile commerce, electronic funds transfer, supply chain management, Internet marketing, online transaction processing, electronic data interchange (EDI), inventory management systems, and automated data collection systems. Ecommerce is in turn driven by the technological advances of the semiconductor industry and is one of the largest sectors of the electronics industry.

One way for entities to boost sales is to bundle items or sell a variety of items for a single price. Bundling items may encourage a customer to buy items that may have a relationship to each other but may not have been bought together without the bundle. For example, when a customer buys an electronic device, the customer may not want to purchase a warranty plan for the electronic device. However, if the entity bundles the warranty plan with the electronic device, the customer may be enticed to buy the warranty plan with the electronic device. Therefore, bundling may be useful to an entity when the entity is attempting to boost sales of a particular item, increase revenue generated from a single item, or the like. Typically, when bundling items, the price for the bundle of items that is charged to the customer is not merely the price of the individual items added together. For example, if an entity bundles a mobile phone having an individual cost of $179.99 with a mobile phone case having an individual cost of $19.99, the bundle price may be $187.99, which is less than the cost of the sum of the individual items. This bundle discount may encourage the customer to buy both items within the same transaction and from the same vendor as opposed to purchasing the items individually in different transactions or not purchasing some of the items at all.

SUMMARY

Embodiments of the present invention disclose a computer-implemented method, a computer program product, and a system for identifying package bundling on an ecommerce platform. The computer-implemented method may include one or more computer processors receiving a search query from a user for a primary product in an ecommerce platform. One or more computer processors retrieve a search history of the primary product. One or more computer processors retrieve a product history of the primary product. Based on the retrieved search history and the retrieved product history, one or more computer processors create an ontology tree that includes the primary product and one or more related products. Based on the ontology tree, one or more computer processors determine one or more product bundles that include the primary product and at least one of the one or more related products. One or more computer processors generate a first checklist of the one or more product bundles. One or more computer processors display the first checklist to the user.

DETAILED DESCRIPTION

When shopping on ecommerce websites, especially a website that allows multiple vendors and brands to sell through their platform, there are often many different ways an item may be packaged or described, either alone or bundled with accessories, making it challenging for a shopper to determine which particular package provides the best value. Often, the descriptions of the products are very robust, but the titles, images, and kits are non-standardized throughout an ecommerce platform. A solution is needed to allow a like-to-like comparison with products and packaging of a product with other items to know the true cost of the product. Embodiments of the present invention recognize that customer satisfaction can be improved by optimizing online purchases by a shopper such that presentation of valuable product features is maximized while the cost of the product is minimized. Embodiments of the present invention provide a solution that extracts product information from product titles, descriptions, and images to generate an optimized list of product bundles for a user. Implementation of embodiments of the invention may take a variety of forms, and exemplary implementation details are discussed subsequently with reference to the Figures.

Figure 1:
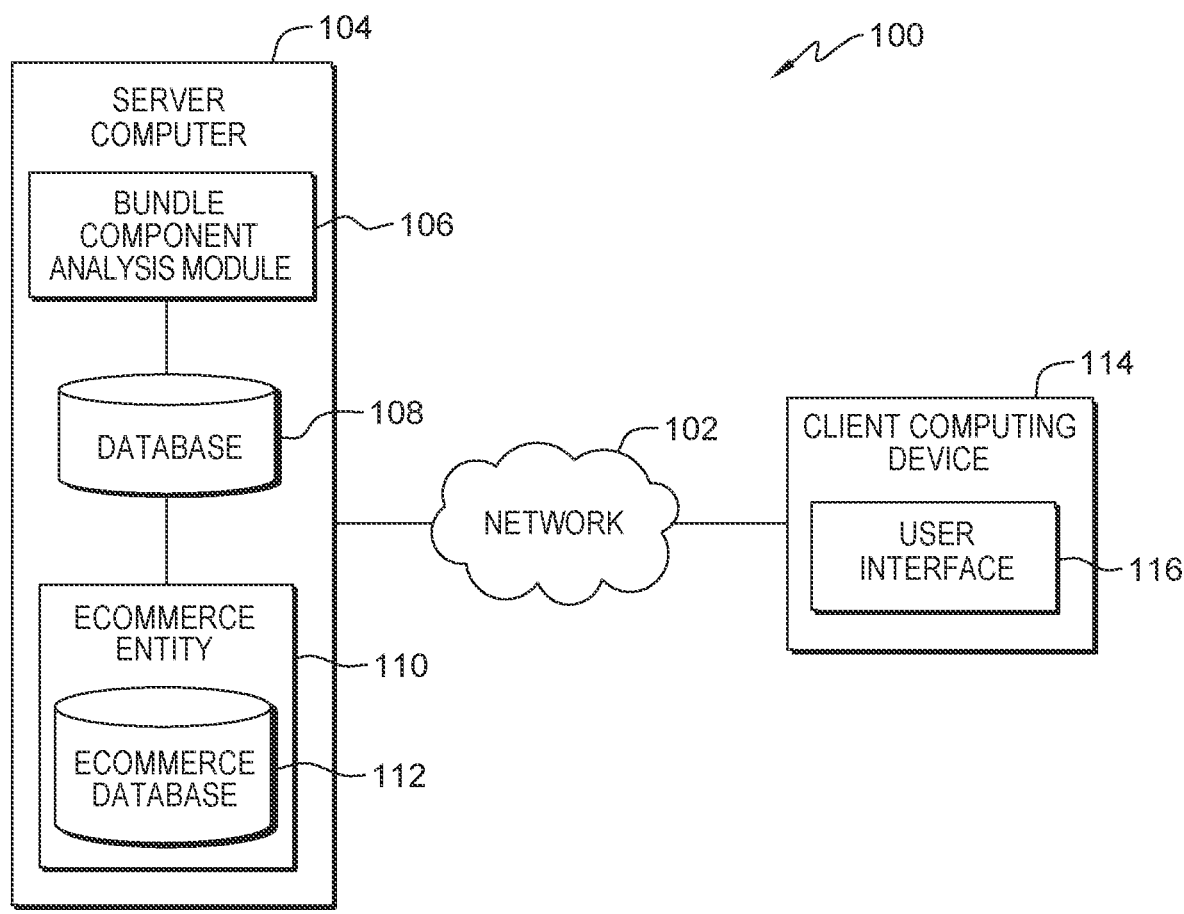
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 114 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 114, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 114 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes bundle component analysis module 106, database 108, and ecommerce entity 110. Server computer 104 may include internal and external hardware components, as depicted and described in further detail with respect to FIG. 3.

Bundle component analysis module 106 identifies individual components within existing product bundles on an ecommerce platform and determines which particular bundles and/or combinations of items offer the best value to meet requirements of a particular shopper. Bundle component analysis module 106 receives a search query from a user for a primary product. Bundle component analysis module 106 retrieves a search history and product history for the primary product. Bundle component analysis module 106 creates an ontology tree associated with the primary product and related products. Bundle component analysis module 106 extracts product components of the primary product and related products. Bundle component analysis module 106 determines one or more product bundles. Bundle component analysis module 106 generates a checklist of the product bundles and displays the checklist to the user. Bundle component analysis module 106 receives user input associated with the checklist. Bundle component analysis module 106 generates an optimized bundle list and displays the optimized bundle list to the user. Bundle component analysis module 106 receives user input associated with the optimized list. Bundle component analysis module 106 determines whether the user selected a bundle from the optimized list, and, if so, then bundle component analysis module 106 updates the product listing in the shopping cart of the user. In the depicted embodiment, bundle component analysis module 106 is a standalone program. In another embodiment, bundle component analysis module 106 is integrated into ecommerce entity 110. Bundle component analysis module 106 is depicted and described in further detail with respect to FIG. 2.

Ecommerce entity 110 is at least one of a plurality of websites, platforms, applications, etc. that enable a user to shop for and purchase products online. Ecommerce entity 110 may be a single vendor or an entity that facilitates online sales with multiple vendors. In the depicted embodiment, ecommerce entity 110 resides on server computer 104. In another embodiment, ecommerce entity 110 may reside elsewhere within distributed data processing environment 100 provided that bundle component analysis module 106 has access to ecommerce entity 110.

Database 108 and ecommerce database 112 each store information used by bundle component analysis module 106. In addition, database 108 stores information generated by bundle component analysis module 106. In the depicted embodiment, database 108 and ecommerce database 112 reside on server computer 104. In another embodiment, database 108 and ecommerce database 112 may each reside elsewhere within distributed data processing environment 100, provided that bundle component analysis module 106 has access to database 108 and ecommerce database 112. A database is an organized collection of data. Database 108 and ecommerce database 112 can each be implemented with any type of storage device capable of storing data and configuration files that can be accessed and utilized by bundle component analysis module 106, such as a database server, a hard disk drive, or a flash memory. Database 108 represents one or more databases that store user preferences associated with ecommerce shopping, including, but not limited to, a name, an address, an email address, a credit card number, an account number, an employer, a job role, a loyalty membership, etc. Database 108 also stores data generated by bundle component analysis module 106, such as parameterized results of a product search query, and an optimized list of product bundles. Ecommerce database 112 represents one or more databases that are a repository for a corpus of products sold by an ecommerce entity, such as ecommerce entity 110.

The present invention may contain various accessible data sources, such as database 108 and ecommerce database 112, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Bundle component analysis module 106 enables the authorized and secure processing of personal data. Bundle component analysis module 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Bundle component analysis module 106 provides information regarding personal data and the nature (e.g., type, scope, purpose, duration, etc.) of the processing. Bundle component analysis module 106 provides the user with copies of stored personal data. Bundle component analysis module 106 allows the correction or completion of incorrect or incomplete personal data. Bundle component analysis module 106 allows the immediate deletion of personal data.

Client computing device 114 can be one or more of a laptop computer, a tablet computer, a smart phone, smart watch, a smart speaker, or any programmable electronic device capable of communicating with various components and devices within distributed data processing environment 100, via network 102. Client computing device 114 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 114 may be integrated into a vehicle of the user. For example, client computing device 114 may include a heads-up display in the windshield of the vehicle. In general, client computing device 114 represents one or more programmable electronic devices or combination of programmable electronic devices capable of executing machine readable program instructions and communicating with other computing devices (not shown) within distributed data processing environment 100 via a network, such as network 102. Client computing device 114 includes an instance of user interface 116.

User interface 116 provides an interface between bundle component analysis module 106 and ecommerce entity 110 on server computer 104 and a user of client computing device 114. In one embodiment, user interface 116 is mobile application software. Mobile application software, or an "app," is a computer program designed to run on smart phones, tablet computers and other mobile devices. In one embodiment, user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 116 enables a user of client computing device 114 to interact with bundle component analysis module 106 to view an optimized list of product bundles, which may include product descriptions and cost comparisons. User interface 116 also enables a user of client computing device 114 to interact with ecommerce entity 110 ecommerce activities, such as searching for and purchasing products.

Figure 2:
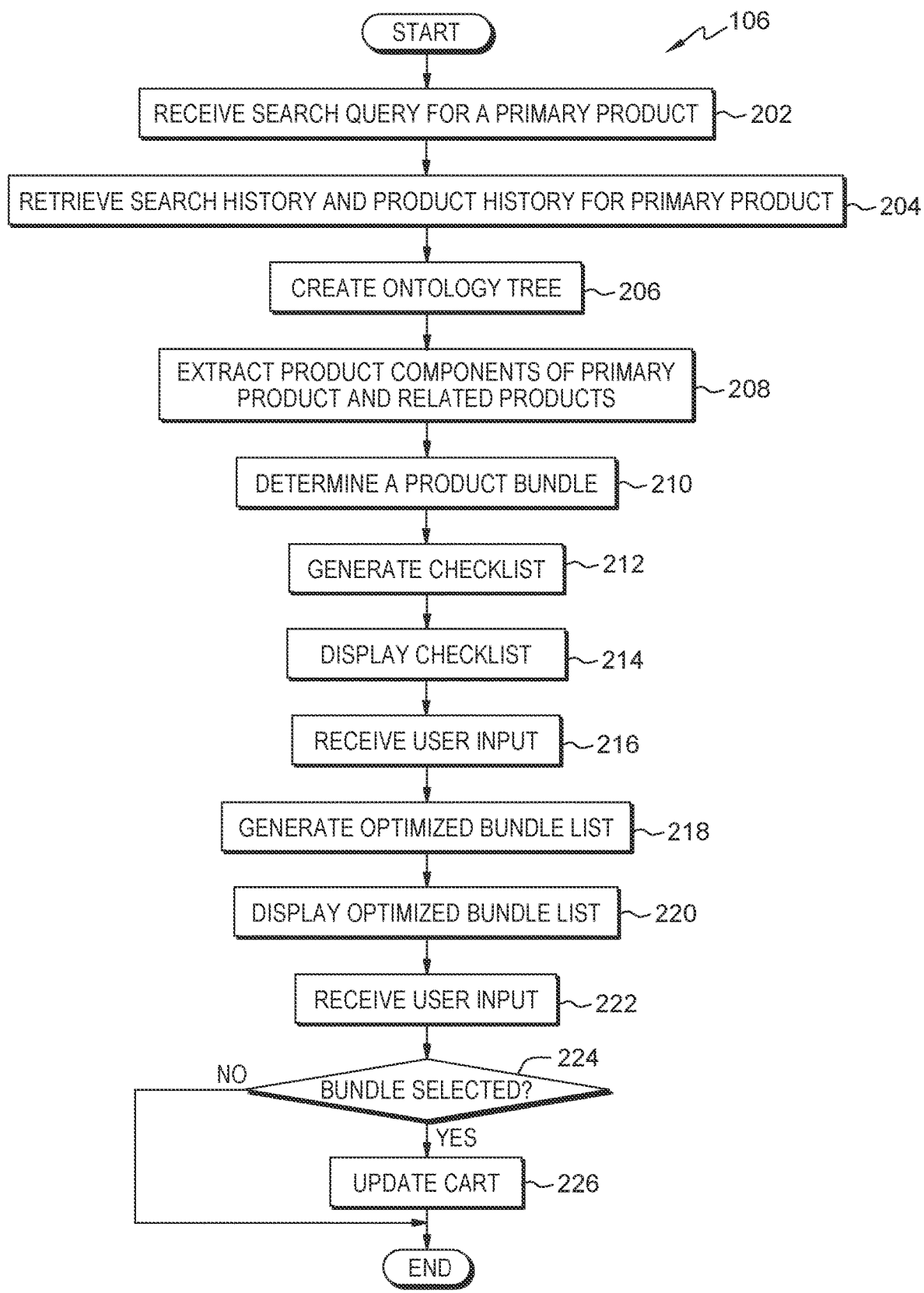
FIG. 2 is a flowchart depicting operational steps of a bundle component analysis module, on a server computer within the distributed data processing environment of FIG. 1, for identifying package bundling on an ecommerce platform, in accordance with an embodiment of the present invention.

FIG. 2 is a flowchart depicting operational steps of bundle component analysis module 106, on server computer 104 within distributed data processing environment 100 of FIG. 1, for identifying package bundling on an ecommerce platform, in accordance with an embodiment of the present invention.

Bundle component analysis module 106 receives a search query from a user for a primary product (step 202). In an embodiment, when a user of client computing device 114 searches ecommerce entity 110 for a primary product to purchase, via user interface 116, bundle component analysis module 106 receives the search query. In one embodiment, the search query for the primary product is for a single product. In another embodiment, the search query for the primary product is for two or more related products. In a further embodiment, the search query for the primary product is for a product bundle of two or more products. In an embodiment, bundle component analysis module 106 receives a search query request from the user when the user places one or more products in the shopping cart of ecommerce entity 110 in preparation for checkout. In another embodiment, bundle component analysis module 106 receives the search query request when the user clicks a "checkout" button, or other button that enables an immediate purchase, displayed by user interface 116.

Bundle component analysis module 106 retrieves a search history and product history for the primary product (step 204). In an embodiment, bundle component analysis module 106 retrieves a history of product searches for the primary product and/or one or more products related to and/or similar to the primary product from ecommerce database 112. For example, bundle component analysis module 106 retrieves crowdsourced data from users of ecommerce entity 110, including the user of client computing device 114, associated with a search for the primary product. In another example, bundle component analysis module 106 retrieves a search history of the primary product by only the user of client computing device 114. In an embodiment, bundle component analysis module 106 retrieves product history of the primary product from ecommerce database 112. The product history is the history of products purchased together with the primary product. For example, bundle component analysis module 106 retrieves crowdsourced historical data of products users purchase in association with the primary product, e.g., a majority of users purchase staples at the same time the users purchase a stapler. In an embodiment, bundle component analysis module 106 determines the most popular product bundles. In an embodiment, the product popularity is based on previous sales statistics of various package bundles or non-bundled products that were sold together in a single order. For example, there may be a stapler bundled with 500 staples that sold over 7000 units in the past month, while a stapler bundled with 1000 staples sold 5000 units in the past month.

Bundle component analysis module 106 creates an ontology tree (step 206). In an embodiment, based on the retrieved search history and the retrieved product history, bundle component analysis module 106 creates an ontology tree of the primary product and similar and/or related products that are frequently packaged as a bundle with the primary product. For example, the ontology tree for a stapler may include staples and a staple remover. In another example, the ontology tree for a crimper may include a cutter and wirecaps.

Bundle component analysis module 106 extracts product components of the primary product and related products (step 208). In an embodiment, based on the similar and/or related products in the ontology tree, bundle component analysis module 106 finds one or more bundles that include the primary product and extracts each component of the bundle as a parameter. For example, in a bundle that includes a stapler and staples, bundle component analysis module 106 extracts the staples as a component of the bundle. In an embodiment, bundle component analysis module 106 uses one or more natural language processing (NLP) techniques to extract the components from the description of the component and/or from the title of the bundle. In another embodiment, bundle component analysis module 106 uses one or more image recognition techniques to extract component identification and/or information from imagery and product packaging. In an embodiment, bundle component analysis module 106 isolates each individual component quantity in the bundle. Continuing the previous example, bundle component analysis module 106 determines the quantity of staples included in the bundle is 500. In an embodiment, bundle component analysis module 106 stores extracted component information in database 108.

In an embodiment, bundle component analysis module 106 uses one or more combinatorial optimization algorithms, as would be recognized by a person of skill in the art, to determine the optimum pricing of each bundle component. In the embodiment, bundle component analysis module 106 determines the equivalent cost of a particular component within the bundle when only the total bundle price is presented in the description. In an embodiment, bundle component analysis module 106 stores the determined optimum pricing in database 108.

Bundle component analysis module 106 determines a product bundle (step 210). In an embodiment, bundle component analysis module 106 identifies one or more product bundles for the user to consider purchasing based on the extracted component information and the determined optimum pricing of each component. In an embodiment, bundle component analysis module 106 determines the most popular product bundles, based on, for example, search history and/or product history. In an embodiment, bundle component analysis module 106 identifies one or more product bundles that meets the requirements of the user at the least expensive cost. In an embodiment where the received query included a bundle, bundle component analysis module 106 performs a reverse deconstructed search to determine one or more additional queries to search in order to produce additional search results. For example, if the received query was for a "stapler kit," then bundle component analysis module 106 determines a stapler kit includes a stapler and staples. Then bundle component analysis module 106 performs a further search on "staplers and staples" that reveals one or more bundles under a category of "office essentials kit" that include a stapler and staples, and may be desirable to the user if the kits are more cost effective.

Bundle component analysis module 106 generates a checklist (step 212). In an embodiment, bundle component analysis module 106 generates a checklist, i.e., an interactive, selectable list, of the one or more identified bundles that include the primary product and bundle components, each with an associated price, i.e., the price of the bundle as well as the individual prices of each component in the bundle.

Bundle component analysis module 106 displays the checklist (step 214). In an embodiment, bundle component analysis module 106 displays the generated checklist to the user of client computing device 114 via user interface 116. In an embodiment, bundle component analysis module 106 displays the bundles in a specific order. For example, bundle component analysis module 106 displays the bundles from least expensive to most expensive. In another example, bundle component analysis module 106 displays the bundles from the bundle that includes the least number of components to the bundle that includes the most components.

Bundle component analysis module 106 receives user input (step 216). In an embodiment, when the user of client computing device 114 selects one or more items in the displayed checklist, via user interface 116, bundle component analysis module 106 receives the user input. For example, the user can select one or more bundles displayed in the checklist in order to receive additional information about the one or more bundles. In an embodiment, the user can request that bundle component analysis module 106 filters the list to better match the requirements of the user. For example, the user may request that bundle component analysis module 106 select bundles from the checklist that include a specific quantity, or threshold quantity, of components, such as only stapler bundles that include 500 or more staples. In another example, the user may request that bundle component analysis module 106 only selects bundles from the checklist that are below a threshold price.

Bundle component analysis module 106 generates an optimized bundle list (step 218). In an embodiment, based on the received user input, bundle component analysis module 106 generates a list of bundles optimized to the requirements of the user. In an embodiment, the optimized bundle list is a checklist that is a subset of the first checklist. In an embodiment, bundle component analysis module 106 optimizes the list based on price. For example, if a user is interested in a crimper bundle that includes a cutter and ten wirecaps, bundle component analysis module 106 includes a bundle in the optimized list that includes a cutter and 12 wirecaps if the bundle is less expensive than a bundle with ten wirecaps. In an embodiment, bundle component analysis module 106 prioritizes the optimized list by price. In another embodiment, bundle component analysis module 106 prioritizes the optimized list by overall value to the user. The overall value may be dependent on the bundle contents, i.e., the components included in the bundle. For example, if a staple bundle that includes 500 staples and a staple remover is only $1 more than a staple bundle that does not include the staple remover, then bundle component analysis module 106 lists the more expensive bundle first because a staple remover by itself costs more than $1. In yet another embodiment, bundle component analysis module 106 prioritizes the optimized list by customer reviews. In a further embodiment, bundle component analysis module 106 prioritizes the optimized list using two or more criteria.

Bundle component analysis module 106 displays the optimized bundle list (step 220). In an embodiment, bundle component analysis module 106 displays the optimized list of product bundles to the user of client computing device 114 via user interface 116. In an embodiment, the optimized list includes details of each bundle. For example, details may include prices of products in the bundle versus purchasing the products separately, as well as information such as "the bundle with three extra wirecaps costs $1.50 less than the bundle with the exact quantity of wirecaps you requested." In another example, details may also include the quantity of each component included in a bundle, such as "one stapler, one staple remover, and 500 staples." In an embodiment, bundle component analysis module 106 also displays extra metrics associated with each bundle to help the user make an informed decision. For example, bundle component analysis module 106 may display customer reviews, shipping availability, product size and/or weight, etc. In an embodiment, bundle component analysis module 106 displays a message and a button that enables the user to swap a selected bundle for one or more items already in the cart, thus minimizing the required number of actions the user has to perform to purchase the bundle. In another embodiment, bundle component analysis module 106 displays a message and a button that enables the user to decline the one or more bundles in the generated list and proceed to purchase the one or more products already in the cart.

Bundle component analysis module 106 receives user input (step 222). In an embodiment, when the user of client computing device 114 selects one or more items in the displayed checklist, via user interface 116, bundle component analysis module 106 receives the user input. For example, the user may check a box next to a listed bundle the user would like to purchase. In an embodiment where bundle component analysis module 106 displays a message and a button that enables the user to swap a selected bundle for one or more items already in the user's shopping cart, bundle component analysis module 106 receives user input when the user clicks the provided button. In an embodiment where bundle component analysis module 106 displays a message and a button that enables the user to decline the one or more bundles in the generated list and proceed to purchase the one or more products already in the cart, bundle component analysis module 106 receives user input when the user clicks the provided button.

Bundle component analysis module 106 determines whether the user selected a bundle from the optimized list (decision block 224). In an embodiment, based on the received user input, bundle component analysis module 106 determines whether the user selected one or more bundles from the displayed optimized list via user interface 116.

If bundle component analysis module 106 determines the user selected a bundle from the optimized list ("yes" branch, decision block 224), then bundle component analysis module 106 updates the cart (step 226). In an embodiment, responsive to determining the user selected a bundle from the displayed list, bundle component analysis module 106 adds the bundle to the user's shopping cart of ecommerce entity 110. In an embodiment where the user clicked a button that swaps a selected bundle for one or more items already in the cart, bundle component analysis module 106 removes the products originally placed in the cart, i.e., the original search query, and replaces them with the selected bundle.

If bundle component analysis module 106 determines the user did not select a bundle from the optimized list ("no" branch, decision block 224), then bundle component analysis module 106 ends execution. In an embodiment where the user clicked a button that declines the one or more bundles in the generated list, bundle component analysis module 106 does not perform additional actions.

In an example embodiment, a user has opted in to bundle component analysis module 106 and is shopping online for office supplies in ecommerce entity 110, via user interface 116. After browsing various items, the user puts a $20 stapler in the shopping cart of ecommerce entity 110. Before checking out, the user decides to also buy a staple remover. The user finds a staple remover for $5 and adds it to the cart. Bundle component analysis module 106 detects the two items in the cart, pairs the functionalities of the two separate items, and finds a product bundle that combines the functionalities of the two items into one product. Bundle component analysis module 106 generates a recommendation and displays, via user interface 116, information regarding a stapler with a built-in staple remover for $22. Bundle component analysis module 106 also displays a one-click option to swap the two items in the user's shopping cart for the item that includes both functionalities. The user clicks the button and bundle component analysis module 106 swaps the products in the cart, saving the user $3.

Figure 3:
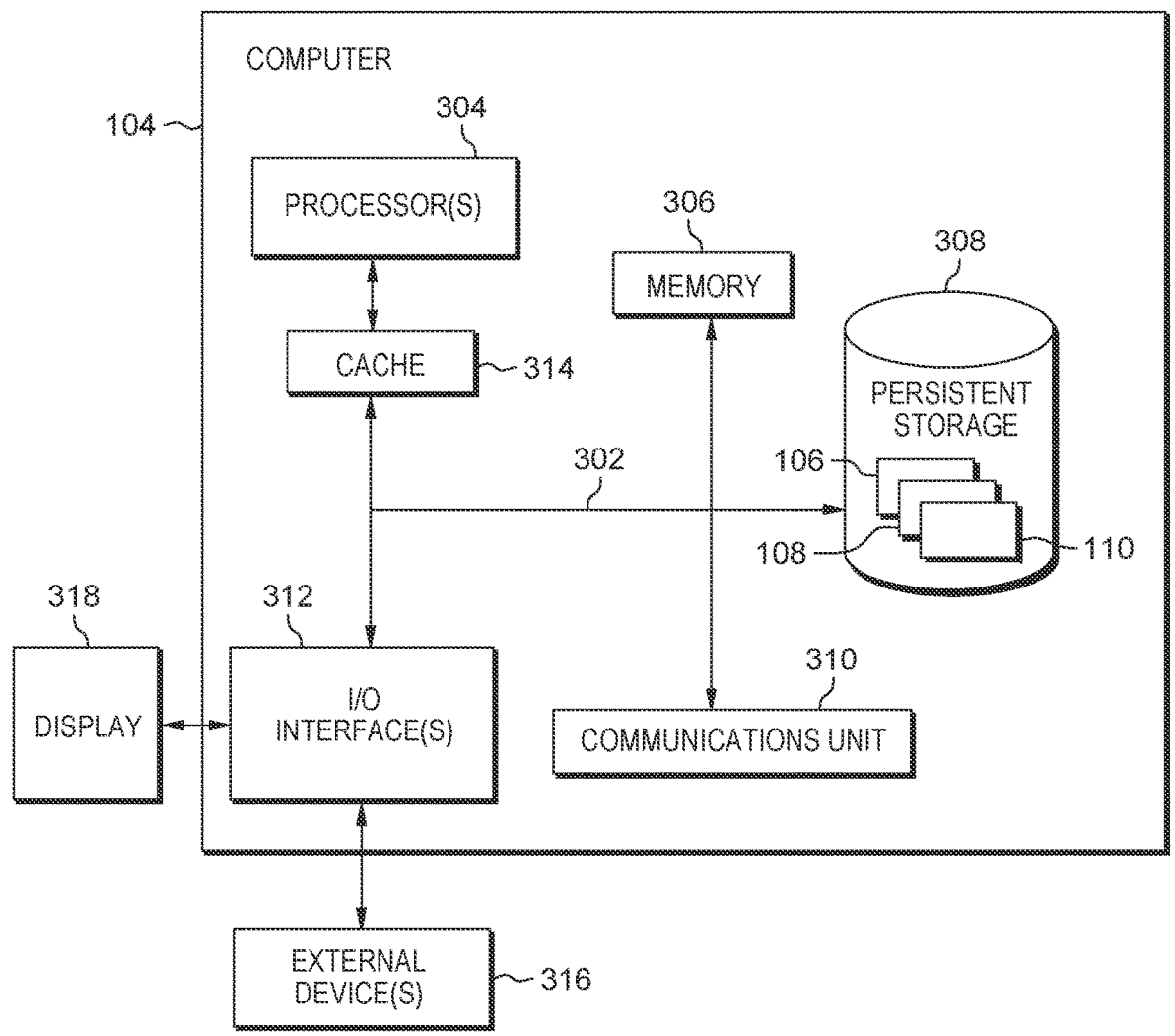
FIG. 3 depicts a block diagram of components of the server computer executing the bundle component analysis module within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., bundle component analysis module 106, database 108, and ecommerce entity 110, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 114. In these examples, communications unit 310 includes one or more network interface cards. Communications unit 310 may provide communications through the use of either or both physical and wireless communications links. Bundle component analysis module 106, database 108, ecommerce entity 110, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., bundle component analysis module 106, database 108, and ecommerce entity 110 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, a user of an ecommerce platform places a primary product in a cart, wherein the cart is a shopping cart associated with the ecommerce platform;
   based on the primary product in the cart, receiving, by the one or more computer processors, a search query from the user for the primary product in the ecommerce platform;
   retrieving, by the one or more computer processors, a search history of the primary product, wherein the search history includes crowdsourced search data from a plurality of users of the ecommerce platform;
   retrieving, by the one or more computer processors, a product history of the primary product, wherein the product history includes crowdsourced historical data of one or more products that a majority of the plurality of users purchased in association with a purchase of the primary product;
   based on the retrieved search history and the retrieved product history, creating, by the one or more computer processors, an ontology tree that includes the primary product and one or more related products;
   based on the ontology tree, determining, by the one or more computer processors, one or more product bundles that include the primary product and at least one of the one or more related products, wherein the primary product and the at least one of the one or more related products are components of the one or more product bundles;
   generating, by the one or more computer processors, a first checklist of the one or more product bundles, wherein the checklist includes a price associated with each of the one or more product bundles and a price associated with each of the components in each of the one or more product bundles;
   displaying, by the one or more computer processors, the first checklist to the user in a user interface;
   displaying, by the one or more computer processors, a first interactive button in the user interface to enable a replacement of the primary product in the cart with a selection of a first product bundle from the first checklist;
   receiving, by the one or more computer processors, a selection of the first interactive button; and
   replacing, by the one or more computer processors, the primary product in the cart with the first product bundle.

2. The computer-implemented method of claim 1, further comprising:
   receiving, by the one or more computer processors, a first input to the first checklist from the user, wherein the first input includes one or more filters;
   based on the first input, generating, by the one or more computer processors, a second checklist, wherein the second checklist includes a subset of the one or more product bundles;
   displaying, by the one or more computer processors, the second checklist; and
   receiving, by the one or more computer processors, a second input to the second checklist from the user, wherein the second input is a selection of a second product bundle from the second checklist.

3. The computer-implemented method of claim 2, wherein receiving the second input to the second checklist further comprises:
   displaying, by the one or more computer processors, a second interactive button in the user interface to enable a replacement of the primary product in the cart associated with the ecommerce platform with the selection of a second product bundle;
   receiving, by the one or more computer processors, a selection of the second interactive button; and
   replacing, by the one or more computer processors, the first product bundle in the cart with the second product bundle.

4. The computer-implemented method of claim 1, further comprising:
   utilizing, by the one or more computer processors, one or more natural language processing techniques to extract information associated with each of the components in the ecommerce platform from a description of each of the components and from a title of a product bundle that includes each of the components; and
   utilizing, by the one or more computer processors, one or more image recognition techniques to extract information associated with each of the components in the ecommerce platform from imagery and product packaging that includes each of the components.

5. The computer-implemented method of claim 1, wherein the primary product is selected from the group consisting of: a single product, two or more related products, and a product bundle of two or more products.

6. The computer-implemented method of claim 1, further comprising:
   determining, by the one or more computer processors, an equivalent cost of each of the components of the one or more product bundles using one or more combinatorial optimization algorithms.

7. A computer program product comprising:
   one or more computer readable storage media and program instructions collectively stored on the one or more computer readable storage media, the stored program instructions comprising:
   program instructions to determine a user of an ecommerce platform places a primary product in a cart, wherein the cart is a shopping cart associated with the ecommerce platform;
   based on the primary product in the cart, program instructions to receive a search query from the user for the primary product in the ecommerce platform;
   program instructions to retrieve a search history of the primary product, wherein the search history includes crowdsourced search data from a plurality of users of the ecommerce platform;
   program instructions to retrieve a product history of the primary product, wherein the product history includes crowdsourced historical data of one or more products that a majority of the plurality of users purchased in association with a purchase of the primary product;

based on the retrieved search history and the retrieved product history, program instructions to create an ontology tree that includes the primary product and one or more related products;

based on the ontology tree, program instructions to determine one or more product bundles that include the primary product and at least one of the one or more related products, wherein the primary product and the at least one of the one or more related products are components of the one or more product bundles;

program instructions to generate a first checklist of the one or more product bundles, wherein the checklist includes a price associated with each of the one or more product bundles and a price associated with each of the components in each of the one or more product bundles;

program instructions to display the first checklist to the user in a user interface;

program instructions to display a first interactive button in the user interface to enable a replacement of the primary product in the cart with a selection of a first bundle from the first checklist;

program instructions to receive a selection of the first interactive button; and program instructions to replace the primary product in the cart with the first product bundle.

8. The computer program product of claim 7, the stored program instructions further comprising:

program instructions to receive a first input to the first checklist from the user, wherein the first input includes one or more filters;

based on the first input, program instructions to generate a second checklist, wherein the second checklist includes a subset of the one or more product bundles;

program instructions to display the second checklist; and program instructions to receive a second input to the second checklist from the user, wherein the second input is a selection of a first product bundle from the second checklist.

9. The computer program product of claim 8, wherein the program instructions to receive the second input to the second checklist comprise:

program instructions to display a second interactive button in the user interface to enable a replacement of the primary product in the cart associated with the ecommerce platform with the selection of a second product bundle;

program instructions to receive a selection of the second interactive button; and program instructions to replace, by one or more computer processors, the first product bundle in the cart the second product bundle.

10. The computer program product of claim 7, the stored program instructions further comprising:

program instructions to utilize one or more natural language processing techniques to extract information associated with each of the components in the ecommerce platform from a description of each of the components and from a title of a product bundle that includes each of the components; and program instructions to utilize one or more image recognition techniques to extract information associated with each of the components in the ecommerce platform from imagery and product packaging that includes each of the components.

11. The computer program product of claim 7, wherein the primary product is selected from the group consisting of: a single product, two or more related products, and a product bundle of two or more products.

12. The computer program product of claim 7, the stored program instructions further comprising:

program instructions to determine an equivalent cost of each of the components of the one or more product bundles using one or more combinatorial optimization algorithms.

13. A computer system comprising:

one or more computer processors;

one or more computer readable storage media;

program instructions collectively stored on the one or more computer readable storage media for execution by at least one of the one or more computer processors, the stored program instructions comprising:

program instructions to determine a user of an ecommerce platform places a primary product in a cart, wherein the cart is a shopping cart associated with the ecommerce platform;

based on the primary product in the cart, program instructions to receive a search query from the user for the primary product in the ecommerce platform;

program instructions to retrieve a product history of the primary product, wherein the product history includes crowdsourced historical data of one or more products that a majority of the plurality of users purchased in association with a purchase of the primary product;

based on the retrieved search history and the retrieved product history, program instructions to create an ontology tree that includes the primary product and one or more related products;

based on the ontology tree, program instructions to determine one or more product bundles that include the primary product and at least one of the one or more related products, wherein the primary product and the at least one of the one or more related products are components of the one or more product bundles;

program instructions to generate a first checklist of the one or more product bundles, wherein the checklist includes a price associated with each of the one or more product bundles and a price associated with each of the components in each of the one or more product bundles;

program instructions to display the first checklist to the user in a user interface;

program instructions to display a first interactive button in the user interface to enable a replacement of the primary product in the cart with a selection of a first bundle from the first checklist;

program instructions to receive a selection of the first interactive button; and program instructions to replace the primary product in the cart with the first product bundle.

14. The computer system of claim 13, the stored program instructions further comprising:

program instructions to receive a first input to the first checklist from the user, wherein the first input includes one or more filters;

based on the first input, program instructions to generate a second checklist, wherein the second checklist includes a subset of the one or more product bundles;

program instructions to display the second checklist; and program instructions to receive a second input to the second checklist from the user, wherein the second input is a selection of a first product bundle from the second checklist.

15. The computer system of claim 14, wherein the program instructions to receive the second input to the second checklist comprise:
- program instructions to display a second interactive button in the user interface to enable a replacement of the primary product in the cart associated with the ecommerce platform with the selection of a second product bundle;
- program instructions to receive a selection of the second interactive button; and
- program instructions to replace, by one or more computer processors, the first product bundle in the cart with the second product bundle.

16. The computer system of claim 13, the stored program instructions further comprising:
- program instructions to utilize one or more natural language processing techniques to extract information associated with each of the components in the ecommerce platform from a description of each of the components and from a title of a product bundle that includes each of the components; and
- program instructions to utilize one or more image recognition techniques to extract information associated with each of the components in the ecommerce platform from imagery and product packaging that includes each of the components.

17. The computer system of claim 13, the stored program instructions further comprising:
- program instructions to determine an equivalent cost of each of the components of the one or more product bundles using one or more combinatorial optimization algorithms.

* * * * *